United States Patent Office 3,347,530
Patented Oct. 17, 1967

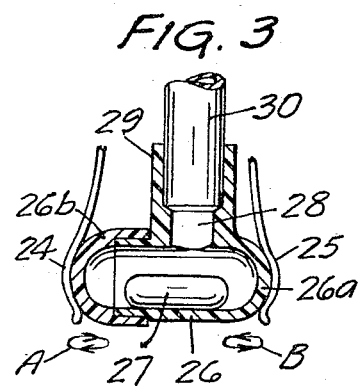
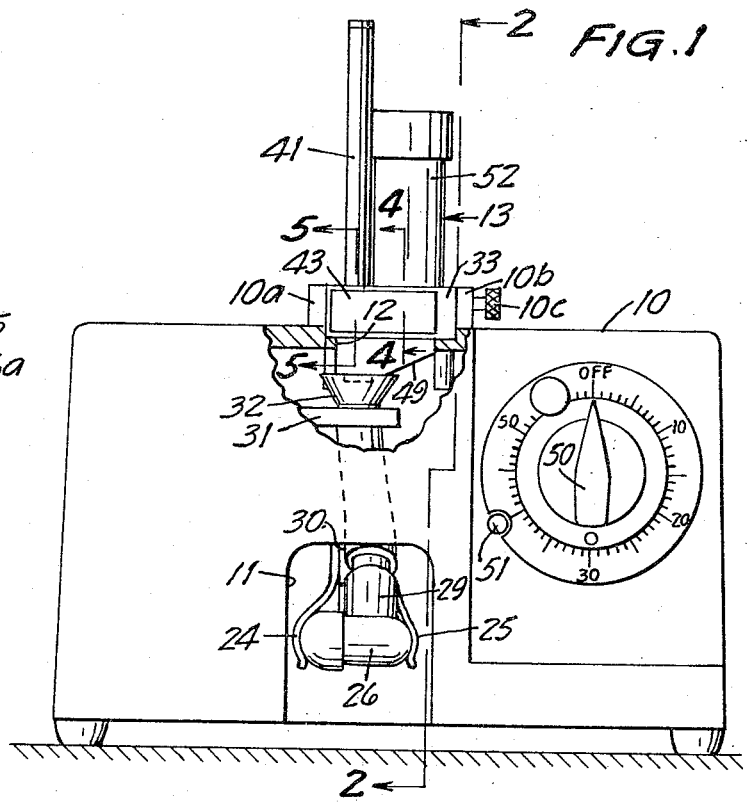
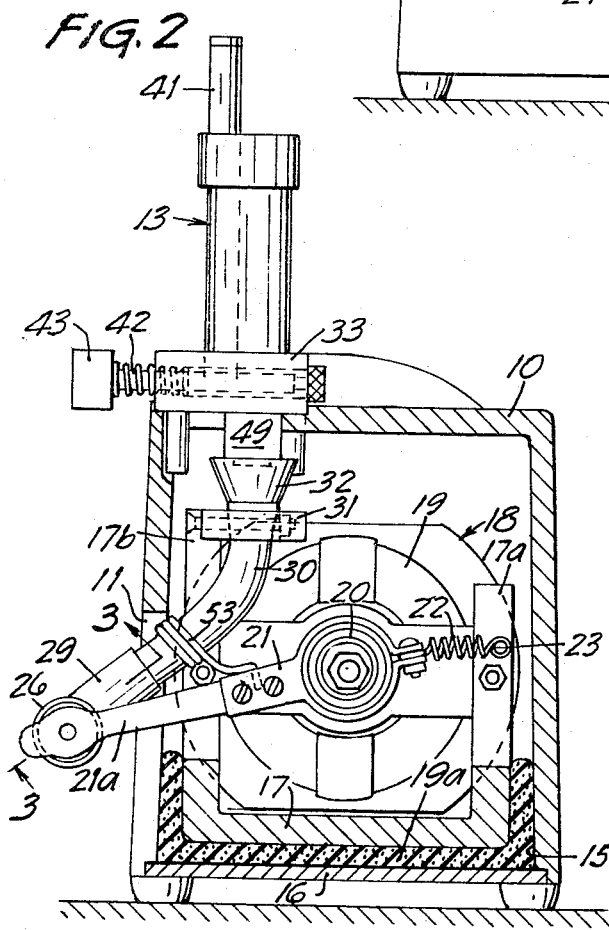
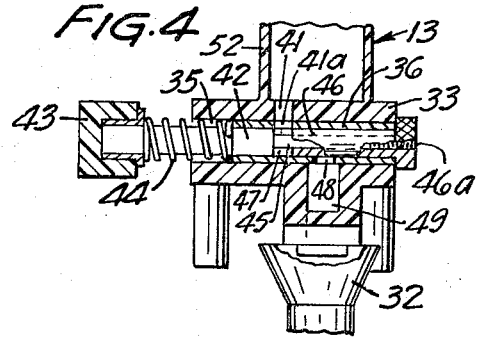
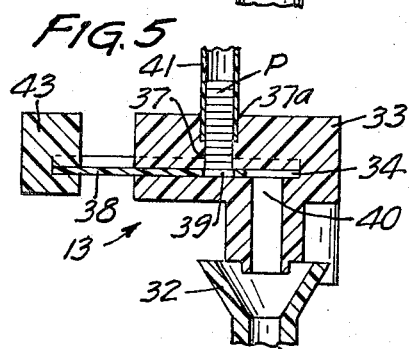

3,347,530
DENTAL AMALGAM MEASURING AND
MIXING APPARATUS
William T. Platt, Stillwater, Minn., assignor to General
Refineries, Inc., St. Paul, Minn., a corporation of
Minnesota
Filed May 12, 1966, Ser. No. 549,505
5 Claims. (Cl. 259—12)

ABSTRACT OF THE DISCLOSURE

An amalgam measuring and mixing apparatus including a mixing capsule removably carried on a mechanical oscillator and continuously connected with a flexible supply tube which is drivably mounted on the mechanical oscillator and has a receiving end anchored to the frame of the machine and receiving mercury and silver alloy pellets from a dispenser with a slide stripping pellets from the supply stack and measuring mercury in a chamber defined by end-to-end plungers connected by a rod extending through the measuring chamber, the dispenser being on the frame of the oscillator and thereby subjected to vibrations during its operation.

---

This invention relates to an apparatus for measuring and mixing the components of a dental amalgam and more specifically relates to apparatus for measuring the desired quantities of silver alloy and mercury for use in a dental amalgam and immediately mixing the silver alloy with the mercury in a mechanical shaking action.

In order to produce the desired mixing of the silver alloy and mercury in the process of making a dental amalgam, these components must be confined in a capsule and then vigorously oscillated by a mechanical shaker. To mount the measuring and dispensing apparatus for the silver alloy and mercury on the same frame with the shaking apparatus has considerable advantage by eliminating the need for physically transferring the measured components to the shaker. However, when the silver alloy and mercury have been stored on the main frame with the shaker in the past, considerable problems have been encountered, firstly in the dispensing of the desired quantities, and secondly in obtaining the desired mixing.

It is to the elimination of these and other disadvantages to which the present invention is directed, along with the inclusion therein of other novel and desirable features.

An object of my invention is to provide a new and novel apparatus for measuring the desired quantities of silver alloy and mercury for use in a dental amalgam.

Another object of my invention is to provide a new and novel apparatus for measuring and mixing together a desired quantity of silver alloy and mercury in the production of a dental amalgam.

A further object of my invention is to provide a new and novel dental amalgam measuring and mixing apparatus wherein the components for the amalgam are measured and delivered directly to the shaking capsule and wherein the component so delivered are mechanically mixed into a homogeneous mass.

These and other objects and advantages of my invention will more fully appear from the following description made in connection with the accompanying drawings, wherein like reference characters refer to the same or similar parts throughout the several views, and in which;

FIG. 1 is an elevation view of the invention;

FIG. 2 is a section view taken approximately at 2—2 in FIG. 1;

FIG. 3 is an enlarged section view taken approximately at 3—3 in FIG. 2;

FIG. 4 is an enlarged section view taken approximately at 4—4 in FIG. 1;

FIG. 5 is an enlarged detail section view taken approximately at 5—5 in FIG. 1.

One form of the invention is shown in the drawings and is described herein. The apparatus includes a housing 10 which comprises the frame and which is constructed of heavy cast iron. The housing 10 has an enlarged access opening 11 at the front therein and has an opening 12 at the top for receiving a portion of the dispensing apparatus 13.

The housing 10 has an open bottom 15 covered by a cover plate 16 which is attached as by screws. The bottom cover plate 16 supports the base 17 of the mechanical oscillator indicated in general by numeral 18. A cushion of foam rubber 19a is provided between the cover plate 16 and the base 17 as to absorb a substantial amount of the mechanical oscillation and thereby prevent excessive vibration of the housing 10.

The mechanical oscillator 18 includes an electric motor 19 having an eccentric camming mechanism 20 on its drive shaft. An oscillatable arm 21 extends generally horizontally from the eccentric cam mechanism 20 and outwardly through the opening 11 of the housing 10. The inner end of the arm 21 is connected by a coil spring 22 to a stationary pin 23 on an upright standard 17a which is a part of the base 17. The outer end 21a of the arm is bifurcated and is provided with a pair of coperating spring clips 24 and 25 which engage and confine the opposite ends of an amalgam mixing capsule 26 therebetween. The capsule 26 includes a body portion 26a and a removable cap 26b, and a pestle 27 therein. The pestle 27 may be constructed of any suitable hard material such as ceramic. The capsule 26 is constructed of a rigid material which is slightly resilient, and in the form shown is constructed of a hard plastic. The body portion 26a of the capsule has a supply opening 28 in the sidewall thereof, and a boss 29 is formed integrally of the sidewall of the capsule and protrudes transversely thereof to receive and mount the lower end of a resiliently flexible supply tube 30 which extends obliquely upwardly and along, but at an acute angle with rescept to the oscillator arm 21. The upper end portion of the tube 30 is affixed in a bracket 31 which is clamped rigidly to an upright standard 17b of the frame. A funnel 32 is affixed to the upper end of the tube 30 to guide the silver pellets and mercury into and through the tube for delivery to the capsule 26.

The silver alloy and mercury measuring and dispensing apparatus 13 includes a rigid body member 33 which is retained between a pair of upright ears 10a and 10b on the housing 10 and is clamped therebetween by a thumb screw 10c. The body member 33 has a pair of elongate slots 34 and 35 therein. The slot 34 is generally flat, wherein the slot 35 is substantially cylindrical. A sleeve type bushing 36 is affixed in the slot 35 and merely provides a lining or interior bearing surface therefor. The slot 34 has a supply port 37 communicating through the body member 30 for delivering silver alloy pellets P into the slot 34. A slide plate 38 in the slot 34 has a pellet receiving aperture 39 normally aligned with the supply port 37. The plate 38 may be moved along the slot 34 so as to align the aperture 39 and the plate with a delivery opening 40 in the body member so as to drop a pellet downwardly to the funnel 32, thereby delivering a pellet to the capsule 26.

The pellets P are supplied to the supply port 37 from a tube 41 which is removably mounted in an enlarged upper portion 37a of the supply port 37. When the pellets are depleated in one of the tubes 41, the tube may be lifted out and replaced by a full one.

At the circular slot 35, the body member 33 and the bushing 36 are provided with aligned supply ports 41 and 41a to deliver mercury therethrough. The first cylindrical plunger 42 is slidably mounted within the bushing 36 and is affixed to a rigid push bar 43 which is also affixed to the slide plate 38 so that the plunger 42 and plate 38 have simultaneous and identical movement. The plunger 42 is encompassed by a spring 44, one end of which bears against the bushing 36 and the other end of which bears against the bar 43 for continuously urging the plunger 42 and plate 38 to the left as seen in FIGS. 4 and 5.

The plunger 42 has a rod 45 affixed thereto and extending forwardly through the bushing 36 and to the exterior of the body member 33. A second plunger 46 is mounted on the rod 45 and is threaded thereto, as at 46a. The plungers 42 and 46 cooperatively define a mercury measuring chamber 47 therebetween which is of an adjustable capacity by adjusting the plunger 46 along the threaded rod 45.

The bushing 36 has a discharge port 48 therein through which the mercury from chamber 47 is discharged when the slide is moved inwardly. The mercury is deposited in the discharge chute 49 from which the mercury is dropped into the funnel 32.

A timer switch 50 and a control switch 51 are provided for controlling the operation of the motor 19 so that when the timer switch 50 is turned to a desired position, manually, and the switch 51 is pressed, the motor is started and is operated for a predetermined number of seconds controlled by the timer switch 50, whereupon the motor shuts down.

When the apparatus is to be used, the push bar 43 of the dispenser 13, is operated once so as to drop a silver alloy pellet P into the funnel 32 to be delivered into the capsule 26. Simultaneously with the dropping of the pellets, a predetermined quantity of mercury from the mercury reservoir 52 is carried in the chamber 47 and is deposited through the discharge port 48 whereupon the mercury drops into the funnel 32 and is delivered through the tube 30 into the capsule 26.

In this manner, the push bar 43 of the dispenser 13 may be operated one or more times, depending upon the total quantity of silver alloy and mercury desired for making the amalgam. The timer switch 50 is then turned, as to ten seconds denoted by the numeral 10 on the scale, and then the control switch 51 is pressed to start the mechanical oscillator. When the motor 19 starts, the arms 24 and 25 are moved in the direction of arrows A and B, see FIG. 3. The capsule 26 moves predominantly longitudinally with somewhat of a sideward wabble. The pestle 27 is vigorously moved from end to end within the capsule so as to break down the silver alloy pellets P and as to mix thoroughly the silver alloy with the mercury. It has been found that with this angular orientation of the capsule, wherein the boss 29 and tube 30 extend obliquely upwardly and generally along the arm 21 from the capsule 26, the mercury and silver alloy will stay within the capsule and will be mixed into an amalgam of the desired consistency. When the timer has returned to zero as seen in FIG. 1, the motor 19 will stop so as to stop the arm 21 and the capsule 26 may be removed from the spring clips 24 and 25 and may be pulled off the end of the tube 30. The cap 26b may then be removed and the amalgam will be spilled out of the capsule and be ready for use. It is to be particularly noted that movement of the oscillating arm 21 is transmitted directly to the tube 30 by a spring wire 53 which is wrapped around the intermediate portion of the tube 30 several times and is then projected into the intermediate portion of the arm 21 so as to be slightly oscillatable transversely of the arm. As the arm is oscillated under influence of the eccentric 20, the motion of the arm is transmitted directly to the tube 30 by the spring 53.

Because the dispenser 13 is adapted for supplying pellets P of the silver alloy, the vigorous vibration of the entire unit including the housing 10 and dispenser 13 has no effect at all upon the dispensing of the silver alloy into the capsule 26.

It will be seen that I have provided a new and improved silver alloy and mercury dispensing and mixing apparatus for producing dental amalgams without requiring any handling of the components of the amalgam.

It will, of course, be understood that various changes may be made in the form, details, arrangement and proportions of the various parts without departing from the scope of my invention.

I claim:

1. A dental amalgam measuring and mixing apparatus, comprising a frame,
a mechanical oscillator on the frame and having an elongate capsule for confining the amalgam components for mixing, the oscillator moving the capsule predominantly longitudinally of the capsule, the capsule having an opening through its side intermediate the ends,
a resilient tube connected with said capsule in communication with said opening and extending obliquely upwardly therefrom, said tube having an upper portion anchored to the frame,
and means for dispensing silved alloy pellets and a predetermined quantity of mercury with each pellet and directing the pellets and mercury into the upper portion of the tube for delivery to the capsule for mixing.

2. A dental amalgam measuring and mixing apparatus, comprising a frame,
a mechanical oscillator on the frame and having an elongate and generally horizontal arm with an outer end and an inner end, the oscillator producing swinging movement of said arm, whereby the oscillatory motion of said outer end substantially exceeds the magnitude of oscillatory movement of said inner end,
an elongate capsule for confining the amalgam components for mixing and having an opening through its side intermediate the ends, said elongate capsule being removably mounted on the outer end of said arm and oriented in the direction of swinging movement whereby the capsule will have a predominately longitudinal motion,
a resilient tube connected with the capsule in communication with said opening and extending obliquely upwardly therefrom and along said arm, the tube having an upper portion anchored to the frame,
means for dispensing silver alloy pellets and a predetermined quantity of mercury with each pellet and directing the pellets and mercury into the upper portion of the tube for delivery to the capsule for mixing,
and means anchoring said tube to said arm and at a position intermediate the inner and outer ends thereof.

3. The dental amalgam measuring and mixing apparatus according to claim 2 wherein said means anchoring the tube to the arm includes a convolution of rigid material encompassing the tube and pivotally connected to said arm for movement transversely thereof.

4. A dental amalgam measuring and mixing apparatus, comprising a frame,
a mechanical oscillator on the frame and having capsule means confining the amalgam components for mixing,
means on the frame for dispensing silver alloy pellets and a quantity of mercury with each pellet, said dispensing means including a body member with a pellet supply opening in the upper portion thereof, the body member also having a slide opening and mercury supply and discharge ports spaced from each other along the slide opening and communicating with the slide opening, said dispensing means also including a pair of end-to-end plungers spaced from each other in said slide opening and cooperating therewith to define a measuring chamber, a connecting rod extending between said plungers and being threaded into one of the plungers to facilitate adjustment of the size of the measuring chamber, and means positioning the plungers to normally maintain the measuring chamber in communication with the supply opening, an elongate upright tubular magazine for containing a stack of silver alloy pellets therein and being removably mounted on the body member and in continuous communication with said opening of the body member for delivering the pellet for dispensing, and means continuously communicating with said capsule means and with said dispenser for delivering the pellets and mercury to the capsule for mixing.

5. A dental amalgam measuring apparatus, comprising a body member having a pair of substantially parallel slots therein, said member having supply ports adjacent each other and each port communicating with a respective slot, said member having delivery ports spaced longitudinally along said slots from said supply ports, means for supplying mercury and silver alloy to respective supply ports, a slide having an apertured plate in one of said slots to receive and deliver silver alloy at the ports and carry the silver alloy therebetween, said slide also having a pair of plungers in the other slot and confronting each other in end-to-end relation to define a mercury measuring chamber therebetween, one of said plungers being affixed to said apertured plate and the other of said plungers being rotatable and extending through said body member and having an enlarged head at the exterior of said body member and bearing against the body member to prevent withdrawal of the plungers therefrom, said head being spaced from and rotatable relative to said apertured plate, and a spring on the slide and urging the slide with respect to the body member to maintain the head against the body member and to retain said slide in predetermined relation with said supply ports.

References Cited

UNITED STATES PATENTS

| | | | |
|---|---|---|---|
| 2,518,773 | 8/1950 | Greenberg | 259—72 |
| 2,879,042 | 3/1959 | Jones | 259—76 X |
| 3,168,213 | 2/1965 | De Gon | 222—137 X |
| 3,229,963 | 1/1966 | Thiel et al. | 259—29 |

WALTER A. SCHEEL, *Primary Examiner.*

R. W. JENKINS, *Assistant Examiner.*